(12) United States Patent
Hagle et al.

(10) Patent No.: US 6,389,792 B1
(45) Date of Patent: May 21, 2002

(54) COMBUSTOR REAR FACING STEP HOT SIDE CONTOUR METHOD

(75) Inventors: Michael P. Hagle, Mason; Junhaur Jih, West Chester; James N. Cooper, Hamilton, all of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/829,384

(22) Filed: Apr. 9, 2001

Related U.S. Application Data

(62) Division of application No. 09/454,708, filed on Dec. 3, 1999, now Pat. No. 6,250,082.

(51) Int. Cl.⁷ .................................................. F02C 1/00
(52) U.S. Cl. ...................................... 60/39.02; 60/753
(58) Field of Search ........................... 60/752, 753, 757, 60/39.02; 431/352

(56) References Cited

U.S. PATENT DOCUMENTS

| | | | | |
|---|---|---|---|---|
| 4,259,842 A | * | 4/1981 | Koshoffer | .................... 60/757 |
| 4,655,044 A | * | 4/1987 | Dierberger | ................ 60/753 X |
| 5,123,248 A | | 6/1992 | Monty et al. | .................. 60/740 |
| 5,528,904 A | * | 6/1996 | Jones et al. | .................... 60/753 |
| 5,960,632 A | * | 10/1999 | Abuaf | ......................... 60/752 |

FOREIGN PATENT DOCUMENTS

| | | |
|---|---|---|
| EP | 0049190 A1 * | 4/1982 |
| EP | 0049190 | 7/1982 |
| EP | 136071 A * | 4/1985 |
| FR | 1432316 | 8/1966 |
| GB | 1138547 | 1/1969 |

\* cited by examiner

*Primary Examiner*—Charles G. Freay
*Assistant Examiner*—Ehud Gartenberg
(74) *Attorney, Agent, or Firm*—Andrew C. Hess; William Scott Andes

(57) ABSTRACT

A combustor liner has a stepped combustor liner surface and an overhang portion forming an air cooling slot. A contoured rear facing edge of the overhang portion reduces turbulence of combustion gas flow and reduces a combustor liner surface area exposed to combustion gases. A thermal barrier coating is also applied to the contoured rear facing edge, reducing heat flow into the overhang portion and hence reducing the operating temperature of the combustor liner. Thus, the amount of cooling air is reduced, which can reduce exhaust emissions increase engine performance and extend a working life of the combustor assembly.

4 Claims, 5 Drawing Sheets

COMBUSTOR REAR FACING STEP HOT SIDE CONTOUR METHOD

This application is a divisional of Ser. No. 09/454,708 filed on Dec. 3, 1999 now U.S. Pat. No. 6,250,082 and claims benefit thereto.

BACKGROUND OF THE INVENTION

This invention relates generally to turbine engines, and more particularly, to slot cooled ring combustors for turbine engines.

A turbine engine includes a compressor for compressing air which is suitably mixed with a fuel and channeled to a combustor wherein the mixture is ignited for generating hot combustion gases. The gases are channeled to a turbine, which extracts energy from the combustion gases for powering the compressor, as well as producing useful work for propelling an aircraft in flight and for powering a load, such as an electrical generator. Increased efficiency in gas turbine engines is accomplished at least in part by an increase in the operating temperature of the combustor. A principal limitation on the operating combustor temperature has been material limitations of a liner in the combustor.

One effective technique for cooling the combustor liner is thin film convection cooling wherein a protective film boundary of cool air flows along an inner surface of the liner via air cooling slots to insulate the liner from hot combustion gases. Aside from forming a protective boundary between the liner and hot gases, the cooling air allows for convective cooling of the liner. See, for example, U.S. Pat. No. 4,259,842. However, the air slots tend to encourage turbulence of combustion gases separating off the ends of the slots, which increases a heat transfer coefficient on the ends of the slots and hence increases the heat load on the combustor liner.

Another effective technique for cooling a combustor liner thermal barrier is the use of thermal barrier coatings that are applied to the inner surface of a combustor liner for providing thermal insulation against combustion gases. Thermal barrier coatings reduce the amount of cooling air required for a given combustion gas temperature, or allow an increase in a combustion gas temperature for increasing efficiency of the engine. See, for example, U.S. Pat. No. 5,960,632. However, process limitations for applying thermal barrier coating, namely undesirable buildup of thermal barrier coatings, prevent thermal barrier coating from being applied to rear facing edges of the combustor liner, thereby exposing the edges to hot combustion gases and allowing undesirable heat flow into the liner.

Accordingly, it would be desirable to provide a combuster assembly with rear facing edges that may be thermal barrier coated without creating undesirable heat buildup in air cooling slots, that reduce combustion gas turbulence at each rear facing edge, and that reduce the combustor liner surface area of the overhang portions.

BRIEF SUMMARY OF THE INVENTION

In an exemplary embodiment of the invention, a combuster includes a combustor liner including a stepped combustor liner surface and at least one overhang portion forming an air cooling slot. A rear facing edge of the overhang portion is contoured to reduce turbulence of combustion gas flow and to reduce an exposed combustor liner surface of the overhang portion. A thermal barrier coating is applied to the contoured rear facing edge, further reducing heat flow into the overhang portion and lowering the operating temperature of the combustor. Thus, the amount of required air cooling is reduced, which can reduce exhaust emissions, increase engine performance, and extend a working life of the combustor assembly. In addition, because of the thermal barrier coating, higher combustion gas temperatures may be achieved to increase the efficiency of a turbine engine without having adverse effects on combustor assembly materials.

DETAILED DESCRIPTION OF THE INVENTION

Figure 1:
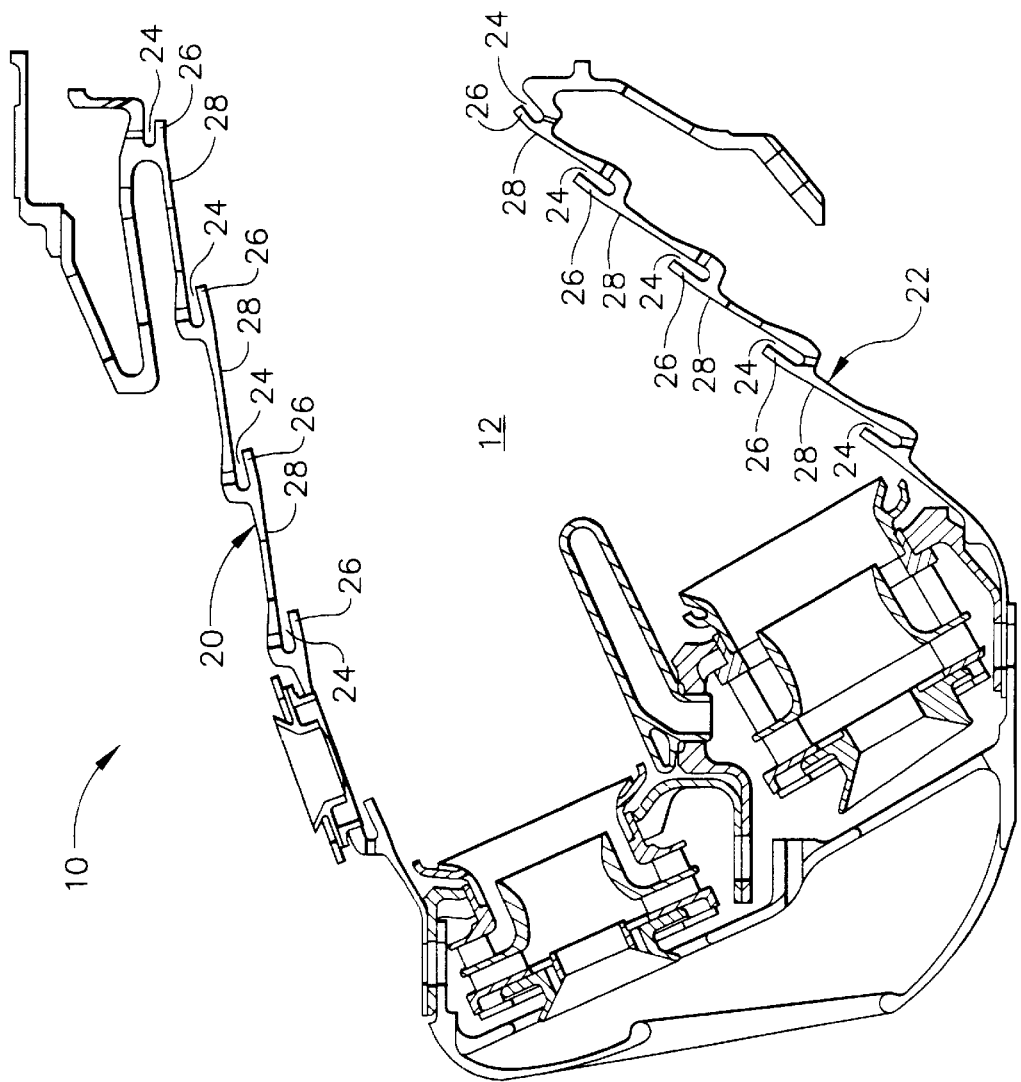
FIG. 1 is partial cross sectional view of a known combustor assembly.

A known combustor assembly 10 that combines thin film convective cooling and thermal barrier coating techniques to lower the operating temperature of a combustor liner in a conventional turbine engine is illustrated in FIG. 1. A conventional fuel injector (not shown) injects atomized fuel into a combustion zone 12 of combustor assembly 10 forming a air-fuel mixture that is typically mixed with a swirler (not shown). An igniter or cross-fire tube (not shown) ignites the air-fuel mixture downstream of the fuel injector, and combustion gases exit combustor assembly through a turbine nozzle (not shown) that directs high energy combustion gases upon a row of turbine blades or buckets (not shown). The gases rotate a turbine wheel (not shown) that delivers rotational energy to the compressor, powers a load, and/or is converted into thrust.

Figure 2:
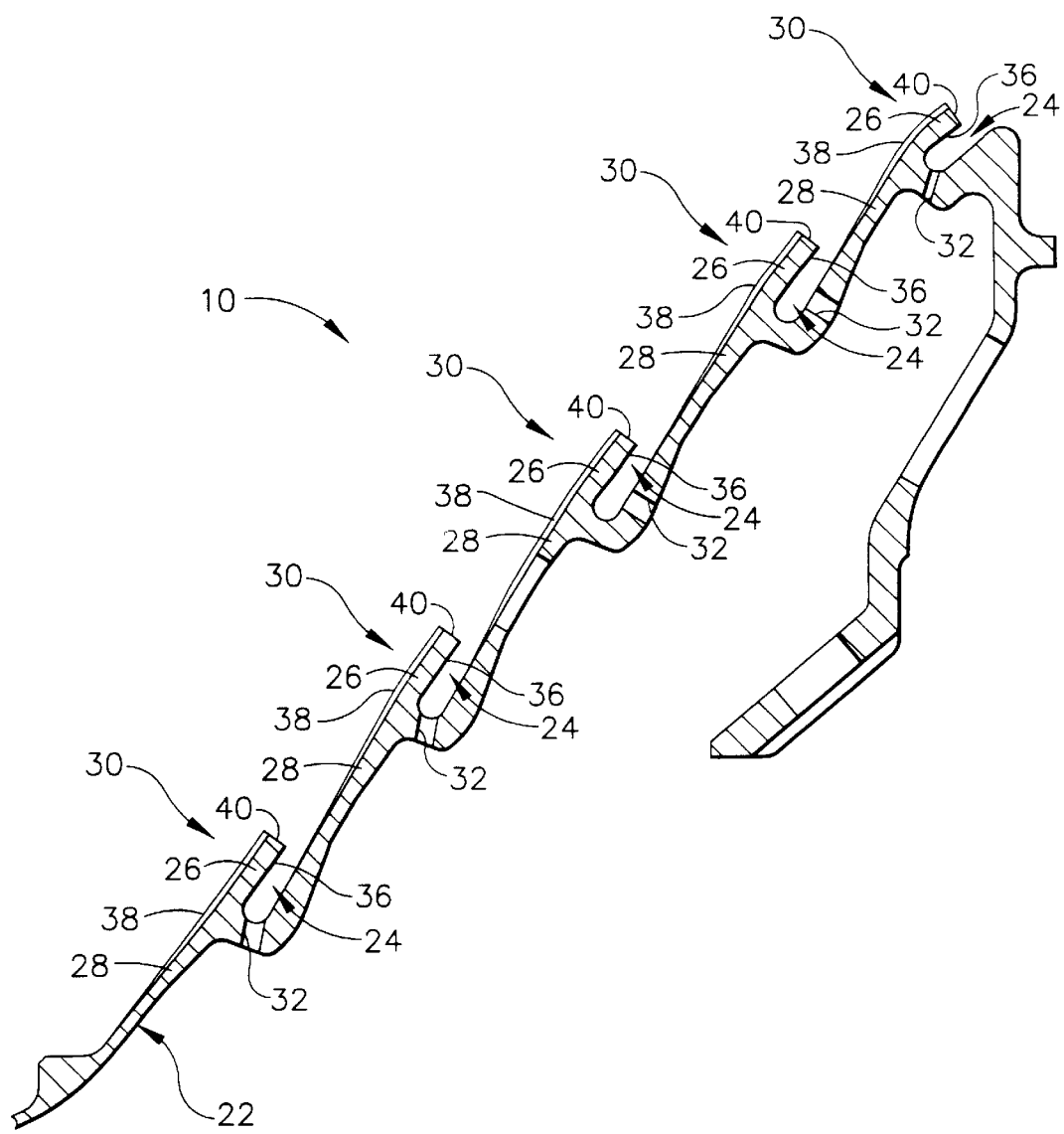
FIG. 2 is a magnified view of a portion of the combustor assembly shown in FIG. 1.

Combustion zone 12 is formed by annular, radially outer and inner supporting members or shells (not shown) and a respective outer liner 20 and inner liner 22. Outer and inner liners 20, 22 each include a plurality of air cooling slots 24 formed by overhanging portions 26 of a combustor liner surface 28. Referring now to FIG. 2, combustor liner surface 28 includes a series of steps 30, each of which form a distinct portion of combustor liner surface 28 that is separated from other portions of combustor liner surface 28 by air cooling slots 24. Air cooling slots 24 include openings 32 to receive air from an air plenum (not shown) and form a thin protective boundary of air between high temperature combustion gases and combustor liner surface 28, as well as providing for convective cooling of combustor liner 22. Air flows from openings 32 through slots 24 between combustor liner surface 28 and a bottom surface 36 of combustor liner overhang portions 26.

A layer 38 of known thermal barrier coating is applied on combustor liner surface 28 and extends from overhang portion 26 to overhang portion 26 of each step 30 to further insulate combustor liner surface 28 from high temperature combustion gases. However, due to process limitations, a rear facing edge 40 of each overhang portion 26 is not coated with a thermal barrier coating 38 because of a resultant undesirable build up of thermal barrier coating 38 under each overhang portion 26. Thus, this type of combustor assembly 10 is disadvantaged in that rear facing edge 40 of each overhang portion 26 is exposed to hot combustion gases and consequently allows undesirable heat flow into each overhang portion 26.

In addition, each rear facing edge 40 includes square corner geometry, i.e., each rear facing edge 40 is substantially perpendicular to combustor liner surface 28 and a bottom surface 36 of each overhang portion 26. Square corner geometry encourages combustion gas flow turbulence as the flow separates off each rear facing edge 40. Turbulence increases the heat transfer coefficient on each rear facing edge 40, which, in turn, leads to increased undesirable heat load on overhang portions 26. Moreover, square corner geometry exposes an undesirably large combustor liner surface area to combustion gases, thereby increasing the heat load of overhang portions 26 and increasing the temperature of the metal therein.

Figure 3:
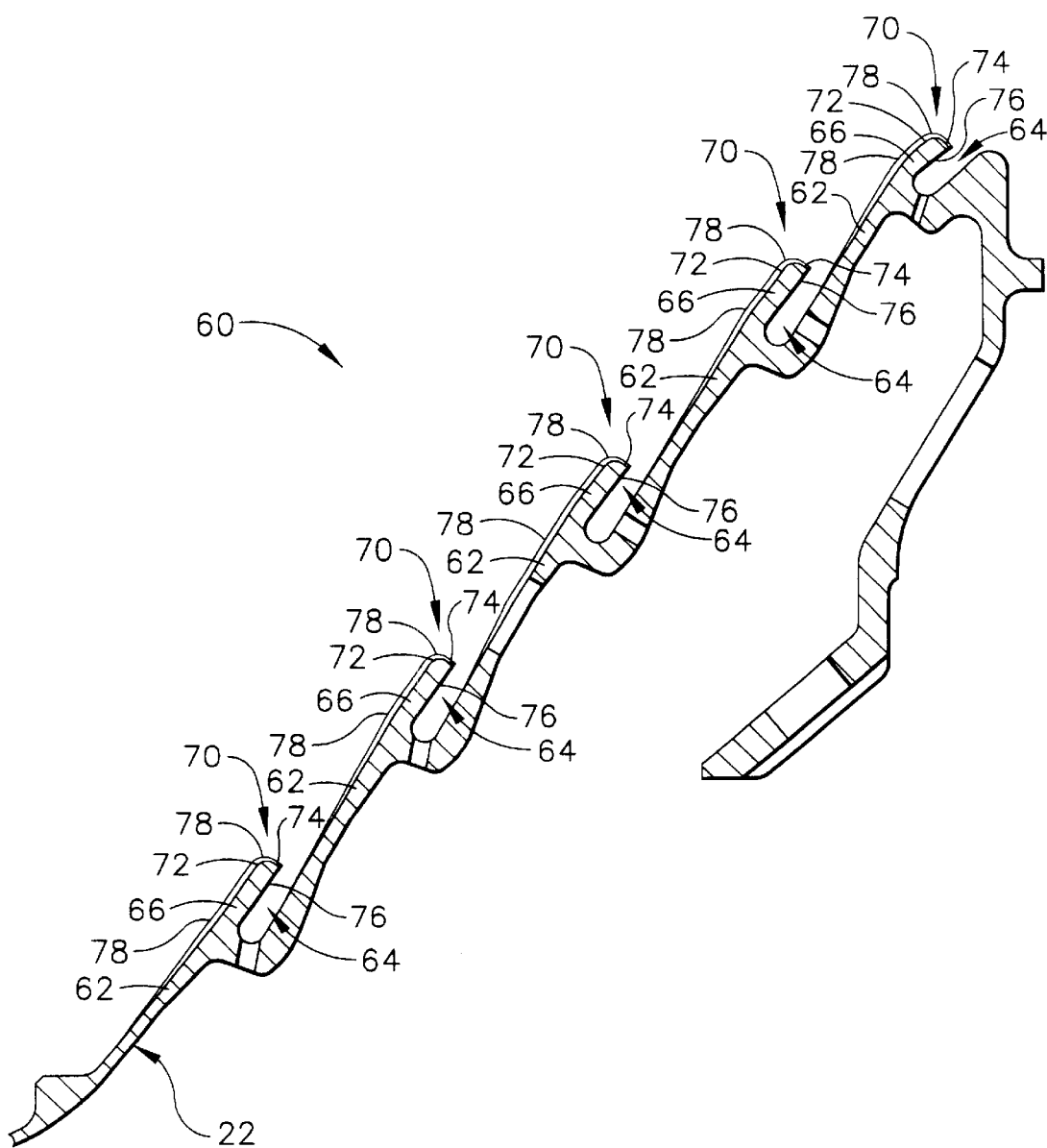
FIG. 3 is a magnified view similar to FIG. 2 of a first embodiment of a combustor liner.

A first embodiment of a combustor liner that at overcomes these disadvantages is illustrated in FIG. 3, and includes a series of combustor liner surfaces 62 separated by air cooling slots 64. Combustor liner surfaces 64 are connected to one another and are arranged in steps relative to one another. Each combustor liner surface 62 includes an overhang portion 66 extending adjacent and forming air cooling slots 64. Each overhang portion 66 includes a contoured rear facing edge 70 to allow for thermal barrier coating, to reduce turbulence of exhaust gases and to reduce a combustor liner surface area that is exposed to high temperature combustion gases.

Specifically, each rear facing edge 70 comprises a first, radius portion 72 that is curved, and a second portion 74 that is substantially straight and perpendicular to a bottom edge 76 of overhang portions 66. Thus, the square corner geometry of known combustor liners is avoided, and a combustor liner surface area exposed to hot combustion gases, or the surface area of combustor liner "hot side," is reduced. Further, combustion gas turbulence as the gases separate from overhang portions 66 near each rear facing edge 70 is reduced, thereby lessening heat input into overhang portions 66 and reducing an operating temperature of overhang portions 66. Furthermore, the geometry of rear facing edges 70 allows for a layer 78 of thermal barrier coating to be applied to rear facing edges 70 by adjusting a spray angle (not shown) to coat rear facing edge surfaces while masking an opening of each cooling slot 64 with a rubber cord (not shown). Therefore, the operating temperature of rear facing edges 70 is further reduced by thermal barrier coating layer 78, thereby extending a working life of combustor liner 60 as well as reducing exhaust emissions and increasing engine performance.

Figure 4:
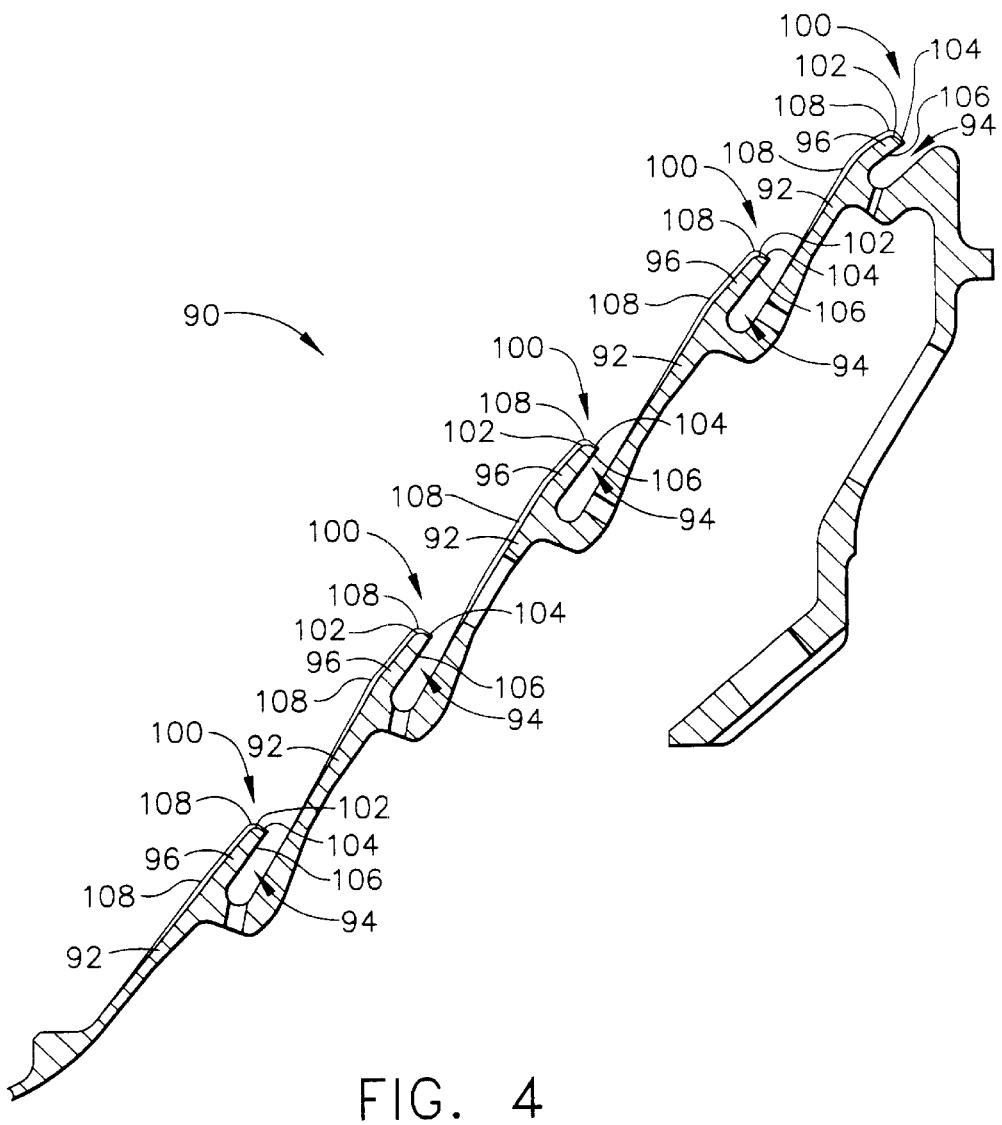
FIG. 4 is a magnified view similar to FIG. 3 of a second embodiment of a combustor liner.

FIG. 4 illustrates a second embodiment of a combustor liner 90 including a series of combustor liner surfaces 92 separated by air cooling slots 94. Combustor liner surfaces 92 are connected to one another and are arranged in steps relative to one another. Each combustor liner surface 92 includes an overhang portion 96 extending adjacent and forming air cooling slots 94. Each overhang portion 96 includes a contoured rear facing edge 100 to allow for thermal barrier coating, to reduce turbulence of exhaust gases and to reduce a combustor liner surface area that is exposed to high temperature combustion gases.

Specifically, each overhang portion 96 is tapered and becomes thinner near each rear facing edge 100, thereby reducing a combustor liner surface area that is exposed to hot combustion gases. Each rear facing edge 100 comprises a first, radius portion 102 that is curved, and a second portion 104 that is substantially straight and perpendicular to a bottom edge 106 of overhang portion 96. Thus, the square corner geometry of known combustor liners is avoided, and a combustor liner surface area exposed to hot combustion gases, or the surface area of combustor liner "hot side," is reduced. Further, combustion gas turbulence as the gases separate from overhang portions 96 near each rear facing edge 100 is reduced, thereby lessening heat input into overhang portions 96 and reducing an operating temperature of overhang portions 96. Furthermore, the geometry of rear facing edges 100 allows for a layer 108 of thermal barrier coating to be applied to rear facing edges 100 by adjusting a spray angle (not shown) to coat rear facing edge surfaces while masking an opening of each cooling slot 98 with a rubber cord (not shown). Therefore, the operating temperature of rear facing edges 100 is further reduced by thermal barrier coating layer 108, thereby extending a working life of combustor liner 90 as well as reducing exhaust emissions and increasing engine performance.

Figure 5:
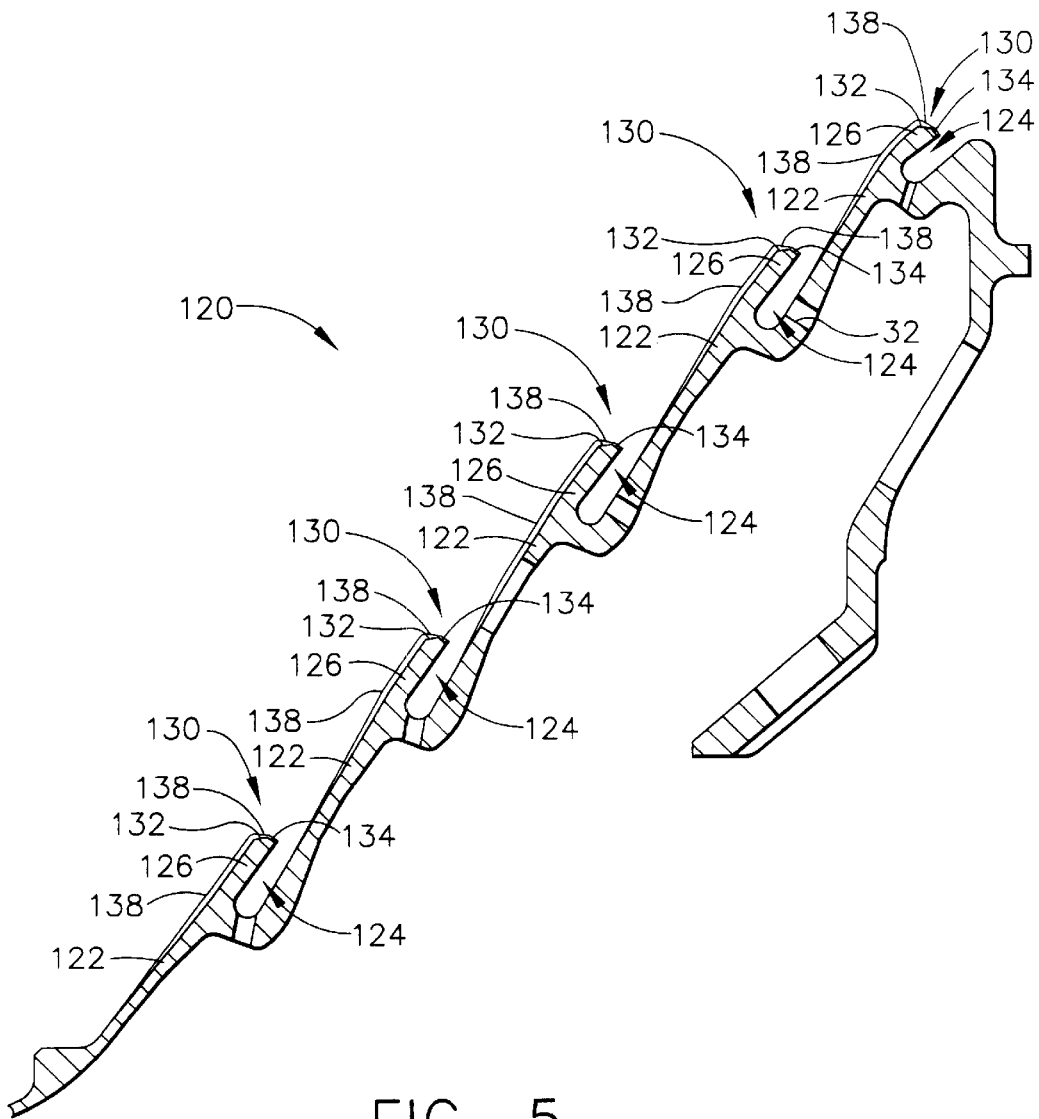
FIG. 5 is a magnified view similar to FIG. 3 of a third embodiment of a combustor liner.

FIG. 5 illustrates a third embodiment of a combustor liner 120 including a series of combustor liner surfaces 122 separated by air cooling slots 124. Combustor liner surfaces 122 are connected to one another and are arranged in steps relative to one another. Each combustor liner surface 122 includes an overhang portion 126 extending adjacent and forming air cooling slots 124. Each overhang portion 126 includes a contoured rear facing edge 130 to allow for thermal barrier coating, to reduce turbulence of exhaust gases and to reduce a combustor liner surface area that is exposed to high temperature combustion gases.

Specifically, each rear facing edge 130 comprises a first portion 132 that is chamfered, and a second portion 134 that is substantially straight and perpendicular to a bottom edge 136 of overhang portion 126. Thus, the square corner geometry of known combustor liners is avoided, and a combustor liner surface area exposed to hot combustion gases, or the surface area of combustor liner "hot side," is reduced. Further, combustion gas turbulence as the gases separate from overhang portions 126 near each rear facing edge 130 is reduced, thereby lessening heat input into overhang portions 126 and reducing an operating temperature of overhang portions 126. Furthermore, the geometry of rear facing edges 130 allows for a layer 138 of thermal barrier coating to be applied to rear facing edges 130 by adjusting a spray angle (not shown) to coat rear facing edge surfaces while masking an opening of each cooling slot 128 with a rubber cord (not shown). Therefore, the operating temperature of rear facing edges 130 is further reduced by thermal barrier coating layer 138, thereby extending a working life of combustor liner 1200 as well as reducing exhaust emissions and increasing engine performance.

While the invention has been described in terms of various specific embodiments, those skilled in the art will recognize that the invention can be practiced with modification within the spirit and scope of the claims.

What is claimed is:

1. A method for decreasing a heat load on a combustor liner for a turbine engine, the combustor liner including a plurality of air cooling slots formed by overhanging portions of a combustor liner surface, each overhang portion having a rear facing edge, said method comprising the steps of:

shaping each rear facing edge to facilitate reducing combustion gas flow turbulence generated as the flow separates off the rear facing edge relative to a blunt edge; and coating the rear facing edge with a thermal barrier coating.

2. A method in accordance with claim 1 wherein the step of shaping each rear facing edge comprises the step of forming a curved rear facing edge.

3. A method in accordance with claim 2 wherein the step of shaping the rear facing edge further comprises the step of tapering the overhang portion.

4. A method in accordance with claim 1 wherein the step of shaping the rear facing edge comprises the step of forming a chamfered rear facing edge.

* * * * *